United States Patent [19]

Merrin et al.

[11] Patent Number: 5,603,187
[45] Date of Patent: Feb. 18, 1997

[54] WATERTIGHT SYSTEM FOR MOUNTING EQUIPMENT ON ROOF

[76] Inventors: William R. Merrin, 277 N. Creek Dr., San Jose, Calif. 95139; Michael R. Steele, 974 Nevada Ave., San Jose, Calif. 95125

[21] Appl. No.: 498,152

[22] Filed: Jul. 5, 1995

[51] Int. Cl.$^6$ ............................................. F04D 29/08
[52] U.S. Cl. ................... 52/58; 52/90.2; 52/198; 52/299; 248/237; 285/42
[58] Field of Search ............................. 52/90.2, 126.5, 52/126.6, 126.7, 299, 58, 198, 199, DIG. 11; 285/92, 390; 248/351, 345, 189, 237, 357

[56] References Cited

U.S. PATENT DOCUMENTS

| | | | |
|---|---|---|---|
| 3,606,232 | 9/1971 | Young | 248/357 |
| 3,845,597 | 11/1974 | Foster | 52/DIG. 11 X |
| 3,921,356 | 11/1975 | Hughes | 248/357 X |
| 4,160,347 | 7/1979 | Logsdon | 52/199 |
| 4,426,813 | 1/1984 | Buzzi | 52/27 |
| 4,453,562 | 6/1984 | Palkovics | 52/58 |
| 4,870,789 | 10/1989 | Clark et al. | 52/126.5 X |
| 4,989,826 | 2/1991 | Johnston | 248/676 |
| 5,056,750 | 10/1991 | Ellithorpe | 52/126.6 |
| 5,067,685 | 11/1991 | Johnston | 248/237 X |
| 5,226,263 | 7/1993 | Merrin et al. | 285/42 X |
| 5,390,451 | 2/1995 | Kopp | 52/58 |
| 5,456,433 | 10/1995 | Burns et al. | 248/237 X |

*Primary Examiner*—Carl D. Friedman
*Assistant Examiner*—Beth A. Aubrey
*Attorney, Agent, or Firm*—Lumen Intellectual Property Services

[57] ABSTRACT

A watertight mounting system for keeping objects, such as climate control devices, solar panels, etc., above a roof deck. The system has a deck mount with a flat plate for fastening directly to the roof deck and a coupling joint with an insertion opening for receiving an elongate joining member by its bottom end. A supporting means or element is attached to the top end of the elongate member. Preferably, the supporting means is a U-shaped channel and is attached to the elongate member by a swivelable cap. The U-shaped channel receives an object framework, preferably made up of beams, which upholds the object. This allows the user to orient the supporting means parallel with the horizontal and thus maintain objects level on a pitched roof deck. The lower portion of the elongate member is tightly enveloped by a flashing to provide a watertight seal between the elongate member and the flashing. The lower portion of the flashing covers the deck mount and is attached to the roof deck in a watertight manner.

4 Claims, 4 Drawing Sheets

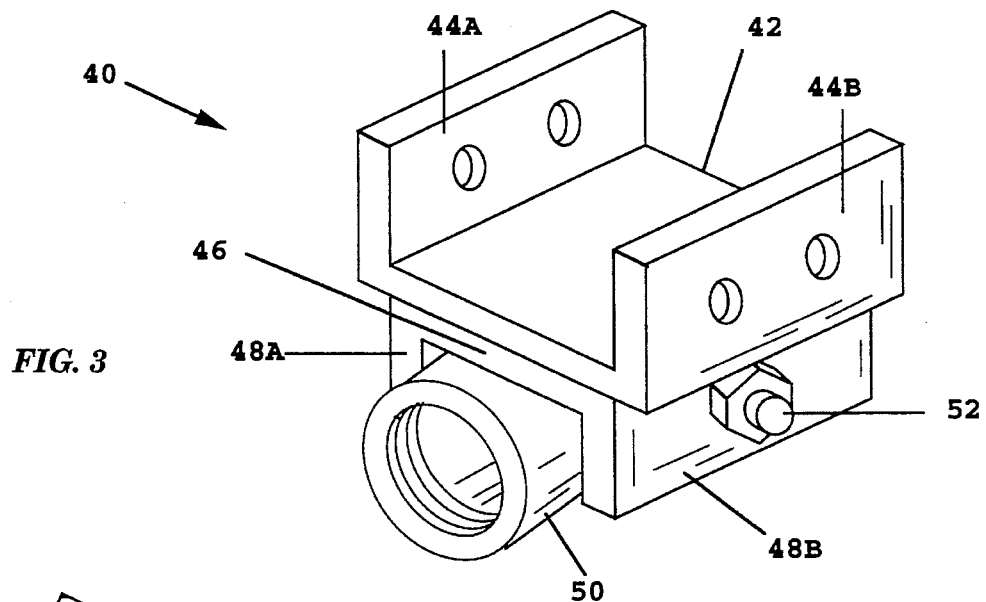
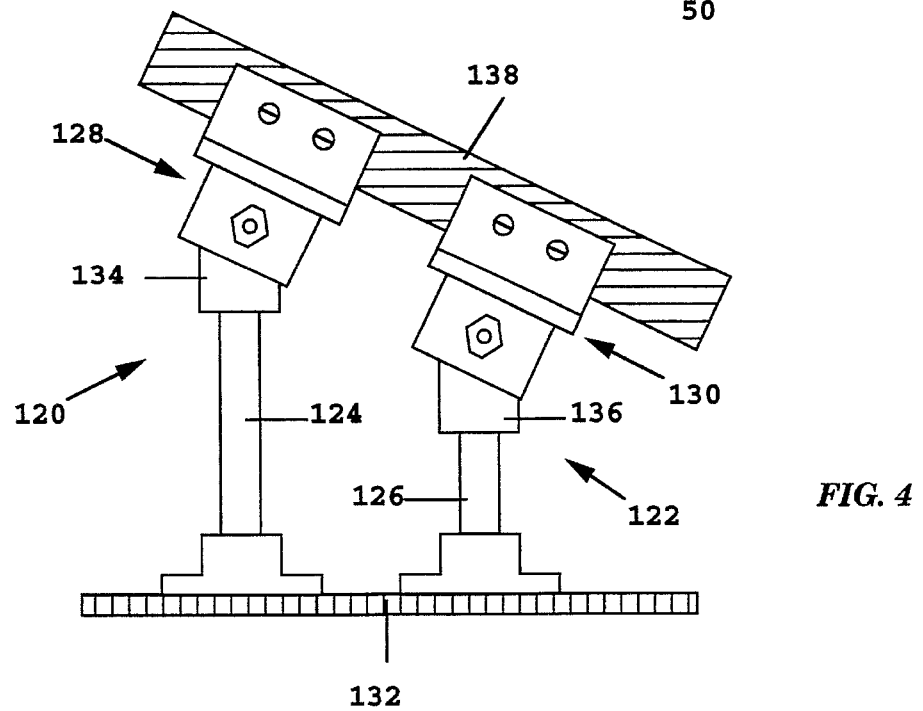

WATERTIGHT SYSTEM FOR MOUNTING EQUIPMENT ON ROOF

BACKGROUND—FIELD OF THE INVENTION

The present invention relates to the field of systems for mounting objects on top of roofs, and in particular to a system to elevate objects above the finished roofing membrane so that it will be a watertight installation, and allow access under the elevated objects.

BACKGROUND—DESCRIPTION OF PRIOR ART

In the mounting of equipment on top of roof decks, there have always been several recurring problems. One of the most inconvenient, costly, and difficult problems has been to waterproof the interface between the equipment mounting and the roofing membrane. Due to wind, rain, building movement, freezing weather, and falling debris the interface between the mount and the roof deck can become damaged causing leaks into the roofing system. These leaks can be very difficult to fix, and often require the removal of the equipment to make repairs.

Another problem in typical equipment-mounting systems is that they require fasteners to be extended through the roofing membrane into the roof deck and the roof rafters underneath to secure the equipment. This kind of application has many drawbacks. First, it limits the orientation and number of locations for mounting the equipment. Second, it makes it almost impossible to maintain a watertight interface with the roofing membrane. Third, if there are no rafters in the mount location additional framing will be required; a costly inconvenience. Finally, this method of mounting makes re-roofing much more difficult, as the equipment must first be removed before re-roofing can begin, and then replaced when re-roofing is completed. More often than not this is very costly.

Yet another problem of typical equipment-mounting systems is that they do not allow the equipment to be mounted at a desired angle or height. For example, one may wish to mount on a pitched roof an air conditioning unit which must be level to the ground. It is also difficult to re-roof the area of the roof under the equipment unless the equipment is elevated to a convenient height. The optimum height suggested by SMACMA and the NRCA is 14" between the top of the roof membrane and the bottom of the equipment.

There have been attempts to solve one or the other of these problems, but not all. In U.S. Pat. No. 4,989,826, issued Feb. 5, 1991, Johnston, Jr. proposed a system for mounting air conditioners on a roof deck using an elevated frame. This solution required a pair of trusses to be first mounted onto the roof deck, then a pair of I-beams to be mounted from one truss to the other. This system does elevate the equipment, but it can only be mounted onto a horizontal roof deck. Furthermore, the design is adapted for air conditioners, and the air conditioner can be mounted at only one height. Each leg of a truss must be manually cut to the right length and force-fitted into its base, which may be inconvenient. But most importantly, Johnston's system does not guarantee a watertight interface between the mounting system and the roof. Another solution, proposed by Buzzi, Jr. in U.S. Pat. No. 4,426,813, issued Jan. 24, 1984, addresses the issue of waterproofing, but does not elevate the equipment. This solution requires a plate to be fastened to a roof rafter beam, and a bolt to extend from the plate up through the roof deck to the level of the equipment. There is a copper flashing around the bolt where it exits the roof deck. One problem with this solution is that the flashing must be made of copper and must be manufactured specifically for this system. Another problem is the aforementioned limiting of location and orientation when using roof rafters for support. The bolt cannot adjust to all pitches of roofs, nor can it be safely extended to a significant height.

OBJECTS AND ADVANTAGES OF THE INVENTION

It is an object of the invention to provide a watertight system for mounting equipment on top of a roof of any pitch and any composition. In particular, it is an object of the invention to ensure that water cannot enter the roofing membrane through the interface between the mounting system and the roofing membrane.

It is another object of the invention to allow equipment of any weight bearable by the building construction to be supported at any height, angle, and location on the roof. Yet another object of the invention is to ensure that the method of mounting the equipment is easy, quick, inexpensive, and reversible, and uses commonly obtainable materials and supplies.

These and other objects and advantages will become more apparent after consideration of the ensuing description and the accompanying drawings.

SUMMARY OF THE INVENTION

This invention takes advantage of a new mounting method to elevate objects on roof decks. In particular, the invention comprises a watertight mounting system for keeping objects, such as climate control devices, solar panels, fixtures, etc., above a roof deck. The system includes a deck mount with a flat plate for fastening directly to the roof deck or roofing membrane. The deck mount has a coupling joint with an insertion opening for receiving an elongate joining member, typically a pipe, by its bottom end. A supporting means or element is attached to the top end of the pipe. Preferably, the supporting means has a swivelable cap with threading and the pipe is also threaded, such that the supporting means can be screwed onto the pipe. This arrangement allows the user to swing the cap and thus orient the supporting means in parallel to the horizontal. The advantage of the swivelable cap is brought to bear when objects need to be maintained level on a pitched roof deck.

It is also preferable, that the supporting means have a U-channel for grasping an object framework. Such framework usually consists of wooden beams. Thus, the U-channel is dimensioned to fit the appropriate beam cross sections. The objects to be placed above the roof deck are then placed on the framework.

The lower portion of the pipe is tightly enveloped with a flashing to provide a watertight seal around the pipe. In a preferred embodiment an additional counter flashing in the form of a pipe collar is placed between the pipe and the flashing for additional leakage protection. The flashing extends downward to cover the deck mount and is fastened to the roof deck. In this manner no water can leak between the flashing and the roof.

BRIEF DESCRIPTION OF THE DRAWINGS

FIG. 3 is a perspective view of an alternative embodiment of the top component of the roof mount assembly.

FIG. 4 is a side view of two roof mount assemblies mounted on a pitched roof.

DETAILED DESCRIPTION OF THE INVENTION

Figure 1:
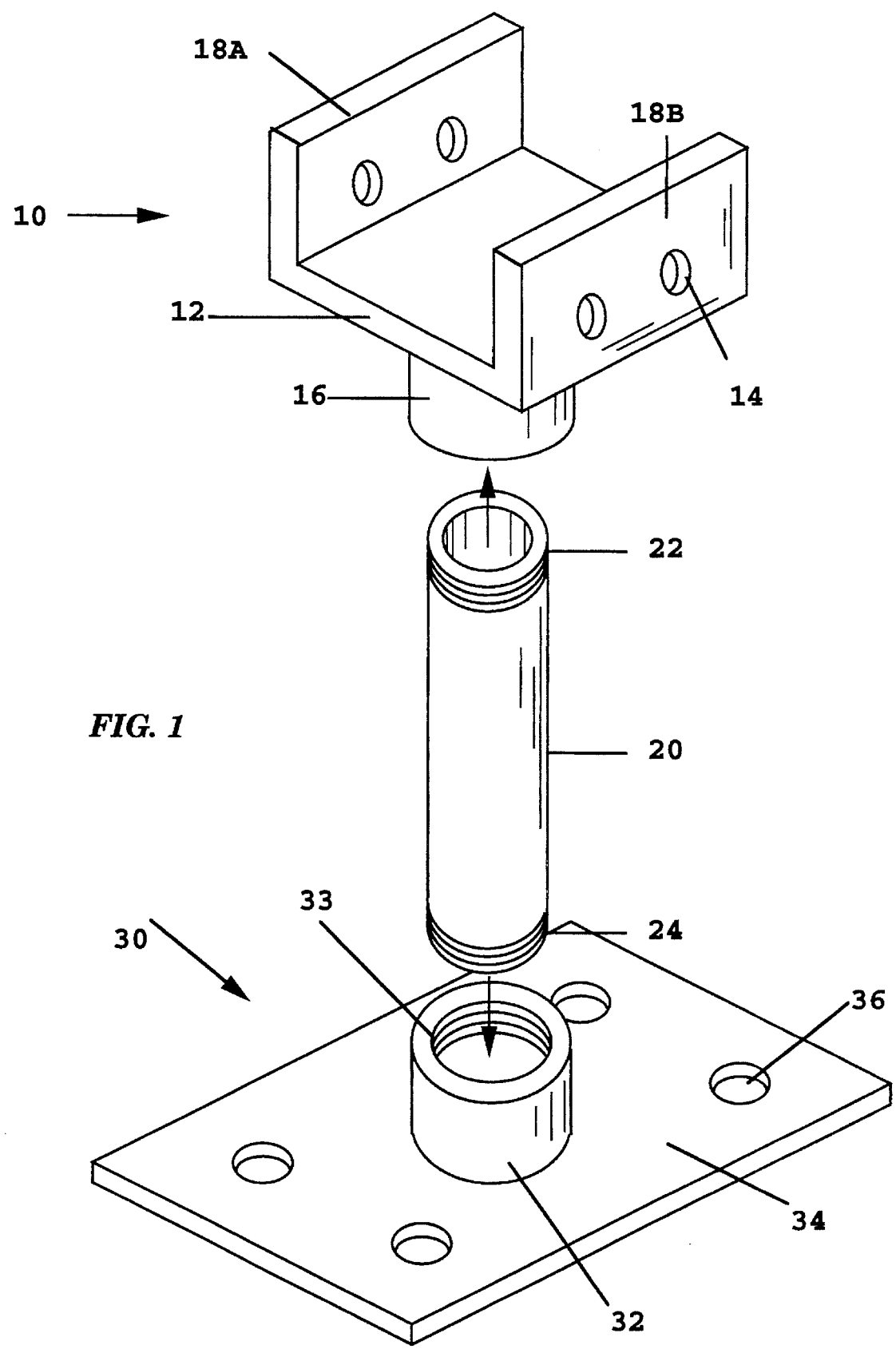
FIG. 1 is a perspective view of the preferred embodiment of the roof mount assembly.

The preferred embodiment of the equipment roof mount assembly is illustrated in FIG. 1. The assembly consists of three parts. The top part is a supporting channel 10 which contacts an object framework (not shown) that will be supporting the object to be mounted on the roof. The bottom part is a deck mount 30 which is mounted to the roof deck. The top and bottom parts are connected by a joining member 20, preferably a section of threaded pipe.

Support channel 10 comprises a metal plate whose two ends have been turned up to form two sides 18A and 18B so that the metal plate is in fact a top U-channel 12. Sides 18A and 18B both have a number of holes 14, two of which are shown in the drawing but more or less can be drilled for admitting fasteners to a wood beam. Attached to the bottom of top U-channel 12 is a coupling member 16, represented by a threaded half-coupling, with its open threaded end pointing downwards.

Deck mount 30 consists of a base plate 34 with a number of holes 36 in it for fastening it to the roof deck. In the center of base plate 34 is attached a coupling joint 32, preferably a threaded half-coupling 32, with an insertion opening 33. Insertion opening 33 is pointed upward.

Pipe section 20 is threaded on both its top end 22 and its bottom end 24. This enables the user to easily screw in pipe 20 into coupling joint 32 and coupling member 16.

In the mounting of the entire assembly, first deck mount 30 is fastened onto the roof deck, then pipe bottom end 24 is screwed into bottom threaded half-coupling 32. Then a flashing 74 is put into place over pipe 20 and deck mount 30 and the roofing membrane is installed. Top threaded half-coupling 16 is screwed onto pipe top end 22. The equipment is then ready to be mounted on top of the entire assembly.

Figure 2:
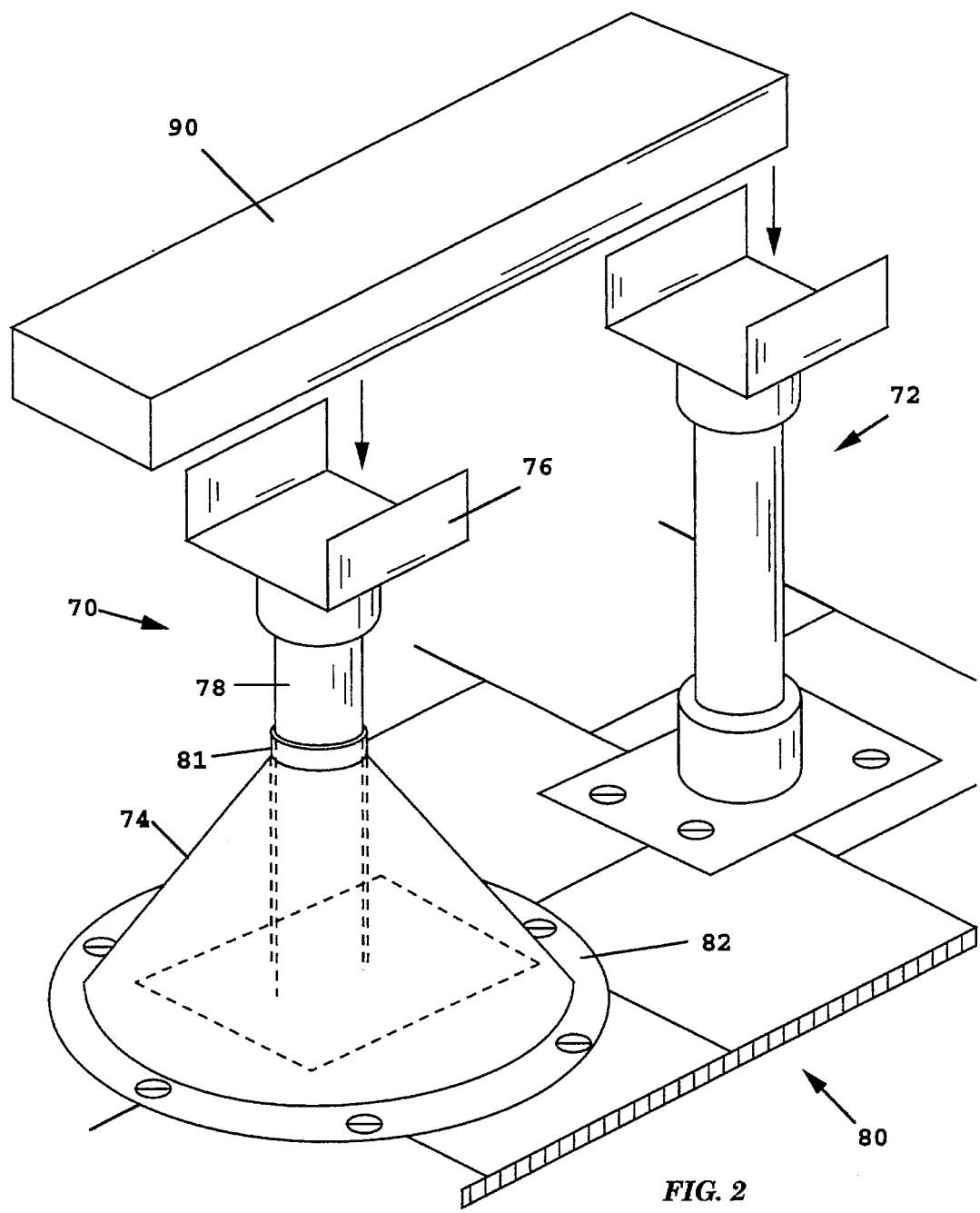
FIG. 2 is a perspective view of two roof mount assemblies mounted on a roof.

FIG. 2 shows how the assembly is mounted on a roof deck 80. Two assemblies 70 and 72 are shown already attached to roof deck 80. Assembly 70 is shown with flashing 74 around it. Such flashings are a common way to make roof pipes watertight, and can be obtained at roofing or sheet metal supply houses. Flashing 74 encloses the lower portion of pipe 78 and deck mount 82, and is counter flashed with a pipe collar 81, e.g., made of EPDM, to ensure that the interface between flashing 74 and pipe 78 will always remain watertight. Flashing 74 is then roofed into roofing membrane 80, so that the interface between a deck mount 82 portion of flashing 74 and roof deck 80 will form a seal. Supporting beam 90 is mounted on top of assemblies 70 and 72 to hold the equipment.

FIG. 3 shows an alternative embodiment of the supporting channel. In this embodiment, supporting channel 40 is adjustable both in direction and angle. Adjustable channel 40 has a top U-channel 42 as in the preferred embodiment, but attached to the bottom of U-channel 42 is a lower and smaller U-channel 46. U-channels 42 and 46 can be attached in many ways. It is most preferable to join U-channels 42 and 46 by piercing a square hole in their adjacent bases and attaching them with elevator bolt. This allows top U-channel 42 to be locked into either of two perpendicular directions. Bottom U-channel 46 has two sides 48A and 48B located directly underneath sides 44A and 44B of upper U-channel 42. Sides 48A and 44B each have only one hole in them, in the center. Inside the recess of lower U-channel 46 is a threaded cap 50, which has a hole punched through its diameter near the top. The open, threaded end of threaded cap 50 is at its bottom. A carriage bolt 52 goes through the hole of threaded cap 50 and through the holes of sides 48A and 48B, attaching threaded cap 50 to the entire supporting channel. Threaded cap 50 is free to rotate 180 degrees in the plane bisecting carriage bolt 52.

FIG. 4 illustrates how the adjustable channel of FIG. 3 can be used to mount objects at an angle with respect to the roof. Two mount assemblies 120 and 122 have been mounted on a roof deck 132. The first assembly's pipe section 124 is longer than the other's pipe section 126. Attached to the top of assemblies 120 and 122 are adjustable channels 128 and 130, respectively. Pipe section 124 fits in the ratable threaded cap 134 of adjustable channel 128, while pipe section 126 fits in the ratable threaded cap 136 of adjustable channel 130. A wood beam 138 is mounted within the top U-channels of each adjustable channel.

Figure 5:
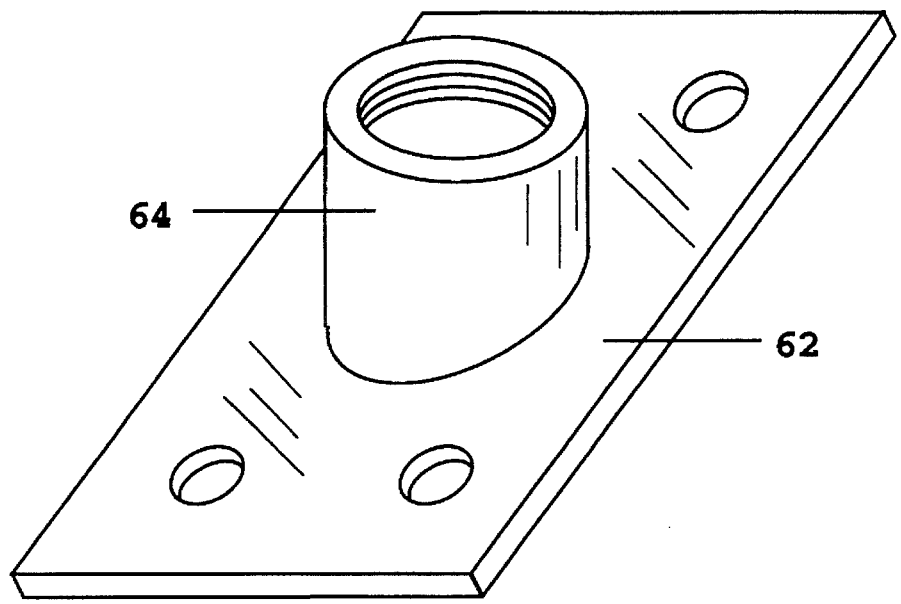
FIG. 5 is a perspective view of an alternative embodiment of the bottom component of the roof mount assembly.

FIG. 5 shows an alternative embodiment of the deck mount. In this embodiment, the deck mount is modified into a pitched deck mount 60 for mounting on the decks of pitched roofs. Pitched deck mount 60 has the same base plate 64, but instead of a half coupling in its center, a full coupling 62 has been attached. Full coupling 62 is cut at the same angle as the pitch of the roof. When pitched deck mount 60 is fastened to the pitched roof deck, the entire assembly will still be standing upright at a 90° angle to the ground.

Figure 6:
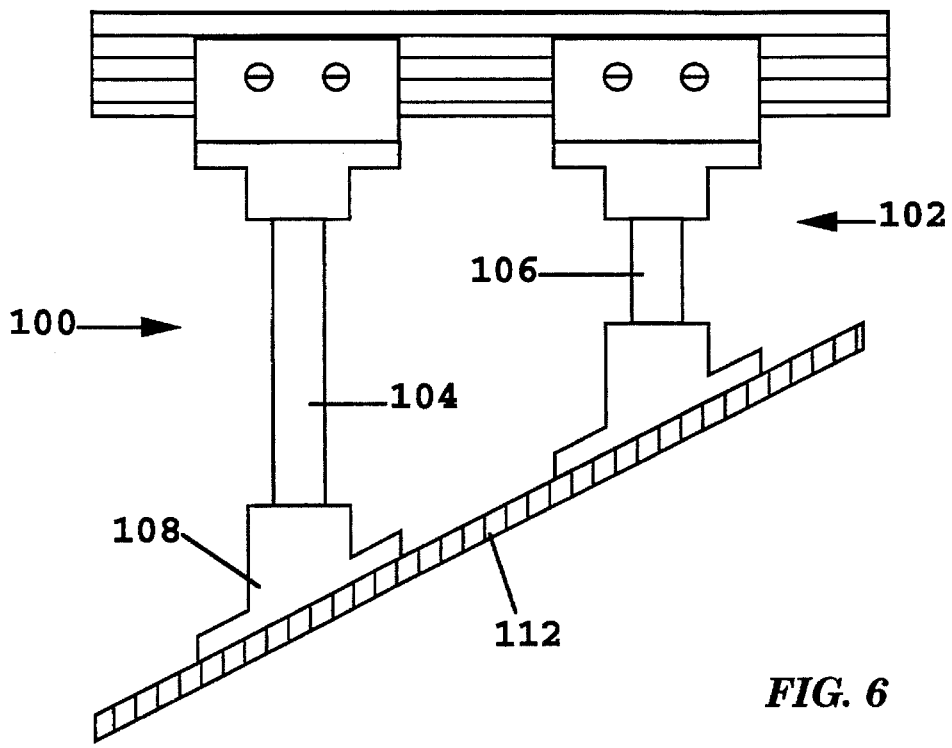
FIG. 6 is a side view illustrating how the roof mount assembly can support objects at an angle with respect to the roof deck.

FIG. 6 shows how the pitched deck mount of FIG. 5 can be used. Two equipment mount assemblies 100 and 102 have been mounted on a pitched roof deck 112. The first assembly's pipe section 104 is longer than the other's pipe section 106. Attached to the bottom of pipes 104 and 106 are pitched deck mounts 108 and 110, respectively. The equipment 114 is mounted within the top supporting channel of each assembly, at an angle level with the ground.

It can be seen from the structure and the operation of this equipment mounting system that water cannot enter the roof through the interface between the mounting system and the roof deck, because each assembly is flashed with commonly available flashing. It can also be seen that equipment of any weight bearable by the roof deck can be supported at any height, angle, and location on the roof deck, since as many mounting assemblies can be used as necessary, distributing the weight of the equipment. Finally, it can be seen that equipment can be mounted in an easy, quick, inexpensive, and reversible way, using commonly obtainable materials and supplies such as pipes, wood beams, and flashing.

While the above description contains many specificities, these should not be construed as limitations on the scope of the invention, but rather as an exemplification of particular embodiments thereof. Many other variations are possible. The dimensions and materials of the components of each embodiment may vary. For example, the pipe section of an assembly can be any length, width, thread, or material; furthermore, both the supporting channel and the deck mount can be made of any material strong enough to hold the equipment, and be fastened by any fastener, such as rivets, nails, screws, or glue. Also, the shapes of the components may be adapted to fit a special purpose. For example, the threaded half-coupling of the supporting channel may be an angled full-coupling as in the pitched deck mount; the U-channel of the supporting channel may have another shape to better hold the equipment; the deck mount may have another shape for different areas of the roof, for instance within gaps, angles and bevels; the pipe section may be bent.

Also, the components may be attached to each other in different ways from those specified. The threaded half-coupling need not be permanently attached or welded to either the supporting channel or the deck mount; the deck mount need not be attached to the roof deck, but may be attached to another structure under the roof, with the pipe section protruding through the roof deck and covered with flashing; or, the deck mount may be attached to structures above the roof; the adjustable channel may attach the threaded cap in other ways so it can rotate in other degrees of freedom. And, finally, any step in the assembly of the apparatus can take place before or after any other step.

Accordingly, the scope of the invention should be determined not by the embodiments illustrated, but by the appended claims and their legal equivalents.

We claim:

1. A watertight mounting system for mounting objects above a roof-deck, said watertight mounting system comprising:
   a) a deck mount having a flat plate for fastening said deck mount to the roof deck, and a coupling joint with an insertion opening pointing away from the roof deck;
   b) an elongate joining member having a top end and a bottom end, said bottom end being fitted into said insertion opening, thereby orienting said elongate joining member away from the roof deck;
   c) a top U-channel for grasping an object framework, said object framework upholding the object above said roof deck, said top U-channel having a coupling member for attaching said top U-channel on said top end of said elongate joining member;
   d) a bottom U-channel, said bottom U-channel and said top U-channel being joined by their bases with an elevator bolt; and
   e) a flashing for tightly enveloping the lower portion of said elongate joining member to produce a watertight seal around said elongate joining member, said flashing extending downward to cover said deck mount and being fastened to said roof deck, thereby providing a watertight seal to said roof deck.

2. The watertight mounting system of claim 1, wherein said top U-channel and said bottom U-channel are joined by said elevator bolt passing through a square hole, thereby allowing said top U-channel to be rotated in 90° increments with respect to said bottom U-channel.

3. A watertight mounting system for mounting objects above a roof deck, said watertight mounting system comprising:
   a) a deck mount having a flat plate for fastening said deck mount to the roof deck, and a coupling joint with an insertion opening pointing away from the roof deck;
   b) an elongate joining member having a top end and a bottom end, said bottom end being fitted into said insertion opening, thereby orienting said elongate joining member away from the roof deck;
   c) a top U-channel for grasping an object framework, said object framework upholding the object above said roof deck, said top U-channel having a cap swivelably mounted in said top U-channel for attaching said top U-channel on said top end of said elongate joining member and thereby allowing to adjust said object framework parallel to the horizontal;
   d) a bottom U-channel, said bottom U-channel and said top U-channel being joined by their bases with an elevator bolt; and
   e) a flashing for tightly enveloping the lower portion of said elongate joining member to produce a watertight seal around said elongate joining member, said flashing extending downward to cover said deck mount and being fastened to said roof deck, thereby providing a watertight seal to said roof deck.

4. The watertight mounting system of claim 3, wherein said top U-channel and said bottom U-channel are joined by said elevator bolt passing through a square hole, thereby allowing said top U-channel to be rotated in 90° increments with respect to said bottom U-channel.

* * * * *